United States Patent
Kobayashi et al.

(10) Patent No.: US 6,677,935 B2
(45) Date of Patent: Jan. 13, 2004

(54) POSITION POINTING DEVICE, PROGRAM, AND POINTED POSITION DETECTING METHOD

(75) Inventors: Masatoshi Kobayashi, Kawaguchi (JP); Yukihiko Yagi, Yokohama (JP); Nobuaki Arai, Tokorozawa (JP)

(73) Assignees: Namco Ltd., Tokyo (JP); Tamura Corporation, Tokyo (JP)

( * ) Notice: Subject to any disclaimer, the term of this patent is extended or adjusted under 35 U.S.C. 154(b) by 251 days.

(21) Appl. No.: 09/958,910

(22) PCT Filed: Feb. 15, 2001

(86) PCT No.: PCT/JP01/01087
§ 371 (c)(1),
(2), (4) Date: Nov. 2, 2001

(87) PCT Pub. No.: WO01/61457
PCT Pub. Date: Aug. 23, 2001

(65) Prior Publication Data
US 2002/0154092 A1 Oct. 24, 2002

(30) Foreign Application Priority Data

Feb. 16, 2000 (JP) .................................. 2000-037574

(51) Int. Cl.[7] .................................................. G09G 1/00
(52) U.S. Cl. ...................... 345/181; 345/156; 345/157; 463/36; 463/37; 463/51
(58) Field of Search .............................. 463/36–37, 51; 345/158, 1.2, 207, 156–184

(56) References Cited

U.S. PATENT DOCUMENTS

| | | | | |
|---|---|---|---|---|
| 5,594,462 A | * | 1/1997 | Fishman et al. | 345/1.2 |
| 5,853,324 A | * | 12/1998 | Kami et al. | 463/2 |
| 6,287,198 B1 | * | 9/2001 | McCauley | 463/37 |
| 6,317,266 B1 | * | 11/2001 | Yoshimura et al. | 359/619 |
| 6,377,250 B1 | * | 4/2002 | Raviv et al. | 345/179 |

FOREIGN PATENT DOCUMENTS

| | | |
|---|---|---|
| EP | 0 807 800 A1 | 11/1997 |
| GB | 2 325 600 A | 11/1998 |
| JP | 9-152307 A | 6/1997 |
| JP | 9-313738 A | 12/1997 |
| JP | 10-118338 A | 5/1998 |

* cited by examiner

Primary Examiner—Richard Hjerpe
Assistant Examiner—Peter Prizio
(74) Attorney, Agent, or Firm—Oliff & Berridge, PLC

(57) ABSTRACT

An objective is to provide a position pointing device, a program and a method for detecting the position pointing device which relates to a device pointing a position on a display screen and which can discriminate a scan mode of a display device and obtain information of pointed position by performing a processing corresponding to the discriminated scan mode. A photosensor (18) provided in the position pointing device detects a scanning beam from a display device (140) and generates a light detection signal. A scan mode discriminating section (30) judges that a scan mode in the display device is not a standard scan mode type, but a multi-density scan type if a frequency component of the light detection signal includes a frequency component of a horizontal synchronous signal in a multi-density scan type display device.

16 Claims, 15 Drawing Sheets

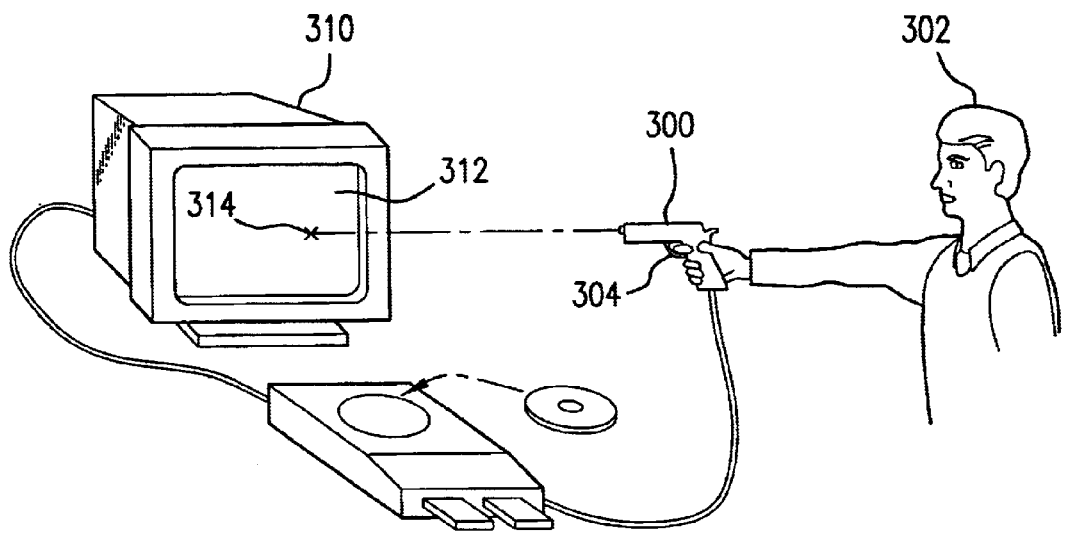
FIG.1A
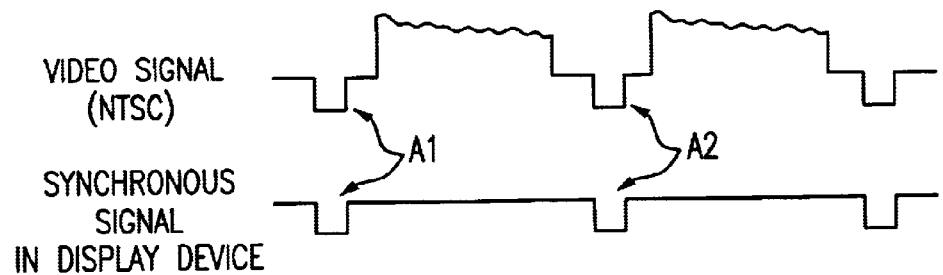
FIG.1B   STANDARD SCAN TYPE
VIDEO SIGNAL (NTSC)
SYNCHRONOUS SIGNAL IN DISPLAY DEVICE
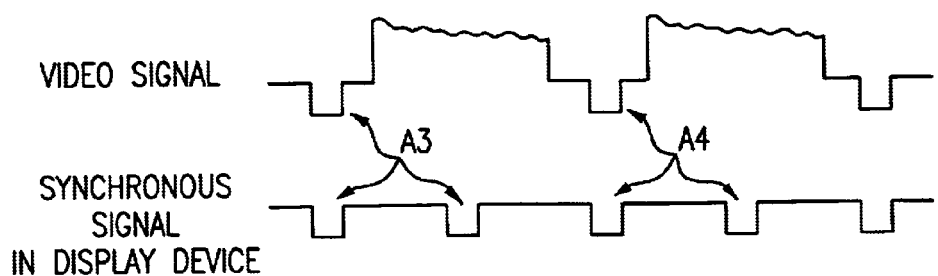
FIG.1C   MULTI-DENSITY SCAN TYPE
VIDEO SIGNAL
SYNCHRONOUS SIGNAL IN DISPLAY DEVICE

MULTI-DENSITY SCAN TYPE

MULTI-DENSITY SCAN TYPE

POSITION POINTING DEVICE, PROGRAM, AND POINTED POSITION DETECTING METHOD

TECHNICAL FIELD

The present invention relates to a device and program for pointing a position on the screen of a display device and a method of sensing a pointed position.

BACKGROUND ART

There has been developed and practically used a game system which used a pointing device such as a gun-type controller or the like for shooting target objects. In such a game system, as shown in FIG. 1A, a player 302 holds a gun-type controller 300 with one hand and aims it at a target object on the screen 312 of a display device 310. When a trigger 304 is actuated by the player 302, a position 314 on the screen 312 pointed by the gun-type controller 300 is sensed by a photosensor or the like included in the gun type controller 300. If the pointed position 314 coincides with the position of the target object displayed on the screen 312, it is judged that the shot hits the target object. If not so, it judged that the shot does not hit the target. One of such gun-type controllers is disclosed, for example, in Japanese Patent Application Laid-Open No. 10-118338.

The conventional display devices including TV receivers was mainly of the standard scan type taking NTSC mode or the like in which the number of horizontal scan lines was 525 and the number of frames per second was 60. In such a standard scan type display device, synchronous (horizontal and vertical) signals contained in a video signal coincided in timing with synchronous signals used in the display device, as shown by A1 and A2 in FIG. 1B. Therefore, if the output timing of a light detection signal from the photosensor in the gun-type controller was measured using the synchronous signals contained in the video signal. the position pointed by the gun-type controller could accurately be calculated.

On the other hand, with recent improvements of the TV receivers, a multi-density (double-, triple- or more density) scan type display device which can realize a high-fineness picture by changing the scan mode without varying the video signals themselves has been put to practical use. Such a multi-density scan type display device realizes a high-fineness picture representation equal to high-vision by interpolating scan line signals to increase the number of scan lines up to two or more times more than those of the standard scan type.

However, the multi-density scan type display device is disadvantageous in that the frequency of the synchronous signals contained in the video signal does not coincide with that of the synchronous signals used in the display device, as shown by A3 and A4 in FIG. 1C. Moreover, the synchronous signals used in the display device retard relative to the synchronous signal in the video signal, as shown by A5 and A6 in FIG. 2A. In addition, the synchronous signals used in the display device may retard by one or more frames relative to the synchronous signals contained in the video signal depending on the type of the display device since the interpolation for the scan signals is carried out using the information relating to the present and previous frames. It has been thus found that the conventional gun-type controllers could not accurately calculate the position pointed by such a multi-density scan type display device.

DISCLOSURE OF THE INVENTION

To overcome the aforementioned problems of the prior art, it is an objective of the present invention to provide a position pointing device, a program and a detecting method of a pointed position which can obtain accurate information of a pointed at position without depending on a scan mode.

To this end, the present invention provides a position pointing device for pointing a position on a screen of a display device, comprising: a pointer which is used to point a position on a screen of a display device; a photosensor provided in the pointer which senses a light from a position pointed by the pointer; and discriminating means which discriminates a scan mode of a display device based an the light detection signal from the photosensor.

According to the present invention, a light from a position pointed by the pointer (pointing body) is sensed by the photosensor, for example. When an operator such as a player or the like uses the pointer to point a position on a screen of a display device. Based on a light detection signal from the photosensor, the discriminating means discriminates a scan mode of the display device. If a scan mode in a display device is discriminated in such a manner, accurate information of a pointed position can be obtained without depending on a scan mode.

Other methods discriminating a scan mode based on a converting signal of a light detection signal from a photosensor without using the light detection signal directly or a method based on an equivalent of a light detection signal falls within the scope of the present invention.

The discriminating means may discriminate a scan mode of a display device by detecting a frequency component of the light detection signal.

A scan mode may be discriminated using other elements of a light detection signal (any element other than a frequency component).

The discriminating means may judge that a scan mode of a display device is not a standard scan type, but a multi-density scan type when a frequency component of the light detection signal includes a frequency component of a synchronous signal of a multi-density scan type display device.

The scan mode to be discriminated by the present invention is not limited to a standard scan type such as NTSC type and PAL type and a multi-density scan type (including double- or more density), but may include a high-vision mode.

The position pointing device may comprise position calculating means which measures a light detection timing based on the light detection signal, a count timing setting signal and a count clock signal, and calculates a position pointed by the pointer; and correcting means which corrects a count timing of a light detection timing in the position calculating means based on correcting information of the pointed position.

For example, the position calculating means may start a counting step using the count clock signal at a timing set by the count timing setting signal, measure the light detection timing and calculate the position pointed by the pointer. Then, a count timing of a light detection timing may be corrected based on the correcting information of the pointed position. Thus, for example, such a situation in which a light detection timing overlaps with a timing at which the count timing setting signal becomes active, thereby disenabling a measurement of a light detection timing can be avoided.

The correcting means may generate the count timing setting signal by shifting a timing at which a synchronous signal included in a video signal becomes active based on the correcting information, and may correct a count timing of a light detection timing in the position calculating means.

Thus, the count timing setting signal can be generated and a count timing of a light detection timing can be corrected through a simple processing.

The position pointing device may comprise position calculating means which measures a light detection timing based on the light detection signal, a count timing setting signal and a count clock signal, and calculate a position pointed by the pointer; and frequency switching means which switches a frequency of the count clock signal based on discriminating information of a scan mode obtained by the discriminating means so that a resolution in detecting a pointed position remains unchanged when a scan mode of a display device is changed.

Thus, accuracy in detection of a pointed position can be maintained without depending on a scan mode.

A computer-usable information storage medium comprise a program for causing a computer to realize: means which performs a process of causing a display device to display a scene for regulating a position pointed by a position pointing device; and means which receives discriminating information of a scan mode of a display device and calculated information of a pointed position from the position pointing device which discriminates a scan mode of a display device based on a light detection signal from a photosensor, then calculates correcting information of the pointed position and transmits the calculated correcting information to the position pointing device. A computer-usable program (including a program embodied in carrier wave) comprises a processing routine for causing a computer to realize the above described means.

According to the present invention, an operator such as a player and the like can regulate a position pointed by the position pointing device while viewing the regulation scene. Based on discriminating information and information of a pointed position from the position pointing device, correcting information of the pointed position is calculated and transmitted to the position pointing device. Thus, based on this correcting information, the position pointing device can correct a count timing of a light detection timing in the calculation of the pointed position. As a result, accurate information of a pointed position can be provided without depending on a scan mode.

A computer-usable information storage medium comprise a program for causing a computer to realize: means which performs a process of causing a display device to display a distinctive frame scene for detecting a frame lag of a light detection signal in a position pointing device; and detecting means which detects a frame lag of a light detection signal due to a scan mode of a display device, based on an output timing of a video signal on the distinctive frame scene and an output timing of pointed position information which is output from the position pointing device corresponding to the distinctive frame scene. A computer-usable program (including a program embodied in carrier wave) comprises a processing routine for causing a computer to realize the above described means.

According to the present invention, the distinctive frame scene for detecting the frame lag is displayed and the frame lag of the light detection signal is detected using the distinctive frame scene. Accurate information of a pointed position can be obtained even in a display device such that the light detection signal lags by one or more frames.

The distinctive frame scene for detecting a frame lag is ideally a whole black-colored scene, but the present invention is not limited to such a scene. For example, a frame lag may be detected by displaying a whole white-colored scene while a whole black-colored scene is displayed. In such a case, a whole white-colored scene is the distinctive frame scene for detecting a frame lag.

In the information storage medium and program, the distinctive frame scene may be a whole black-colored scene, and the detecting means may detect a frame lag of a light detection signal based an output timing of a video signal of the whole black-colored scene and an output timing of pointed position information representing that no light from a display device is detected.

Thus, a frame lag can be detected through a very simple processing of only displaying a whole black-colored scene.

BRIEF DESCRIPTION OF THE DRAWINGS

FIGS. 1A, 1B and 1C illustrate a game system using a gun-type controller and various scan modes in a display device.

BEST MODE FOR CARRYING OUT THE INVENTION

Several preferred embodiments of the present invention will now be described with reference to the drawings.

1. The Whole Game System Configuration

Figure 3:
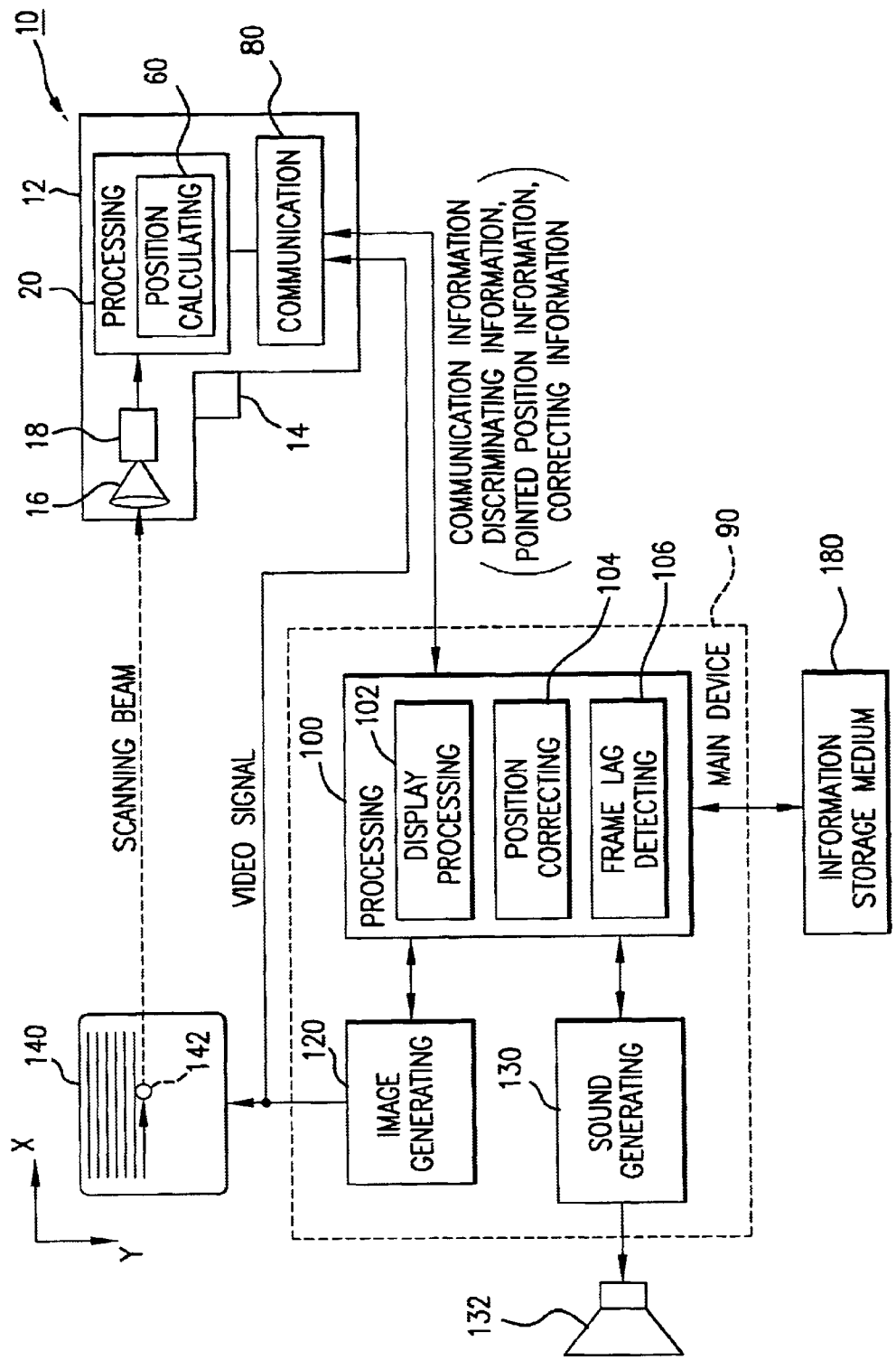
FIG. 3 is a block diagram of a game system using a gun-type controller constructed in accordance with this embodiment.

Referring to FIG. 3, there is shown agate system (or image generating system) which uses a gun-type controller (which is, in a broad sense, a position pointing device) constructed according to this embodiment.

The main device 90 (which is a home game system or the like) comprises a processing section 100, an image generating section 120 and a sound generating section 130.

The processing section 100 is designed to control the entire system and to perform various game processings, based on a program and data stored in an information storage medium 180 and information (relating to discrimination, pointed position, correction and so on) which are delivered between the processing section 100 and a gun-type controller 10. The game processings may include the setting of various modes, the advancement of the game, the display of various objects such as target objects and so on, the hit-checking of virtual shots against the target objects, the calculation of the game results (scores and points), the processing of permitting a plurality of players to play within a common game space and so on. The functions of the processing section 100 may be realized through hardware such as various processors (CPU, DSP and the like) or ASICs (gate array or the like) and by a given program (or game program).

The image generating section 120 performs various game processings according to instructions from the processing section 100 and generates images (or video signals) to be displayed on the screen of a display device 140 (or TV receiver). The sound generating section 130 generates BGMs, sound effects, voices and the like according to instructions from the processing section 100 and outputs them toward a sound output device 132. The functions of the image and sound generating sections 120, 130 may be realized through hardware such as various processors, image and sound generating ASICs and by a given program.

The information storage medium (or computer-usable storage medium) 180 stores information consisting of programs and data. The functions of the information storage medium 180 may be realized through hardware such as an optical disk (CD or DVD), magneto optical disk (MO), magnetic disk, hard disk, magnetic tape, memory (ROM) or the like. The processing section 100 executes various processings of the present invention (or this embodiment) according to the information stored in the information storage medium 180. In other words, the information storage medium 180 has stored information (program or data) for realizing (or executing) various means of the present invention (or this embodiment) (which are particularly various blocks included in the processing section 100).

The programs or data for realizing the means of the present invention (or this embodiment) may be delivered from another information storage medium included in a host device (or server) to the information storage medium 180 through a network. The use of such an information storage medium included in the host device (or server) also falls in the scope of the present invention.

The processing section 100 comprises a display processing section 102, a position correcting section 104 and a frame lag detecting section 106.

The display processing section 102 performs a process of displaying a regulation scene for regulating a position pointed by the gun-type controller 10. The display processing section 102 also performs a process of displaying the whole blacks colored scene (which is, in a broad sense, a distinctive frame scene) to detect the frame lag of a light detection signal in the gun-type controller 10.

The position correcting section 104 receives the discriminating information (discrimination result) for the scan mode of the display device, the calculated information of pointed position and other information from the gun-type controller 10 and calculates the correcting information of the pointed position. The calculated correcting information is then transmitted to the gun-type controller 10.

The frame lag detecting section 106 detects the frame lag (or the number of lagged frames) due to the scan mode of the display device, based on the output timing (which is a timing when a trigger 14 is pulled) of the video signal for the whole black-colored scene (or distinctive frame scene) and the output timing of the information of pointed position for the whole black-colored scene (or the information of pointed position representing the fact that no light is detected).

The gun-type controller 10 comprises a pointer (or casing) 12 having its gun-shaped configuration, a trigger 14 located on the grip of the pointer 12, a lens (or optical system) 16 and photosensor 18 which are included in the pointer 12 adjacent to the muzzle thereof, a processing section 20 for performing a calculation relating to the control and pointed position for the gun-type controller 10, and a communication section 80 functioning as an interface between the gun-type controller 10 and the main device 90. The functions of the processing and communication sections 20, 80 may be realized through hardware such as ASIC or the like or by a combination of various processors with software.

The scheme relating to the operation of the game system shown in FIG. 3 will be described below.

The image generating section 120 in the main device 90 first generates a video signal which is in turn used to actuate and light a picture tube in the display device 140. Thus, objects such as target objects or the like are displayed on the screen of the display device 140.

Next, a player directs the muzzle of the gun-type controller 10 toward the display device 140 to sight a target object on the screen and then pulls the trigger 14. Thus, the screen is flashed by one frame. As the raster scan passes through a detection area 142 on the display device at a position near the position pointed by the gun-type controller 10, the scanning beam thereof enters the photosensor 18 through the lens 16. Thus, the photosensor 18 outputs the light detection signal.

This light detection signal is received by a position calculating section 60 in the processing section 20, which in turn calculates the position pointed by the gun-type controller 10 (X- and Y-coordinates). At this time, the position calculating section 60 calculates the position pointed by the gun-type controller 10 using synchronous signals contained in the video signal from the main device 90.

The calculated information of the pointed position is transferred to the main device 90. The processing section 100 in the main device 90 uses the information of pointed position to perform the hit-check relating to the target object on the screen. If the pointed position coincides with the position of the target object, it is judged that the virtual shot from the gun-type controller 10 hits upon the target object. If not so, it is judged that the shot does not hit upon the target.

2. Discrimination of the Scan Mode

In the game system mentioned above, the synchronous signals contained in a composite video signal are used to calculate the position pointed by the gun-type controller 10 (X- and Y-coordinates).

Figure 2A:
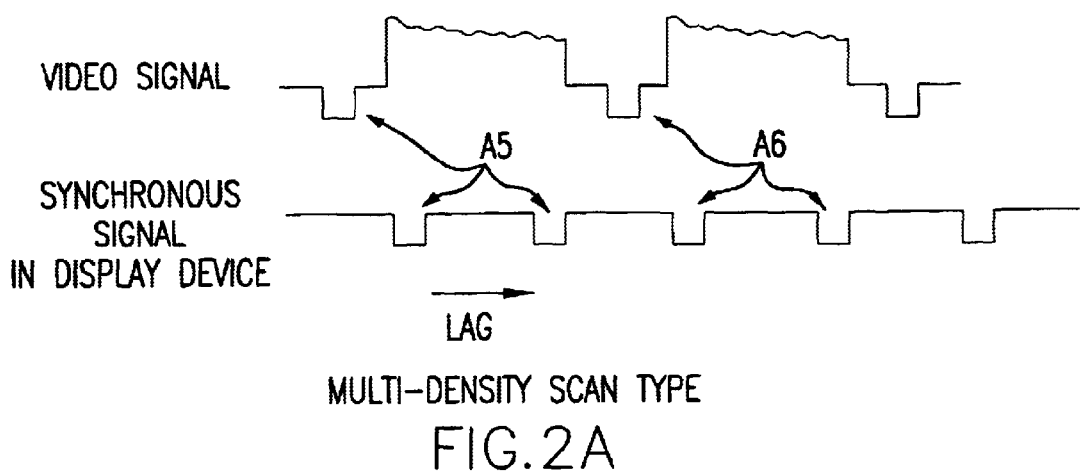
FIGS. 2A and 2B illustrate the lag of synchronous signals used in a multi-density scan type display device.
Figure 2B:
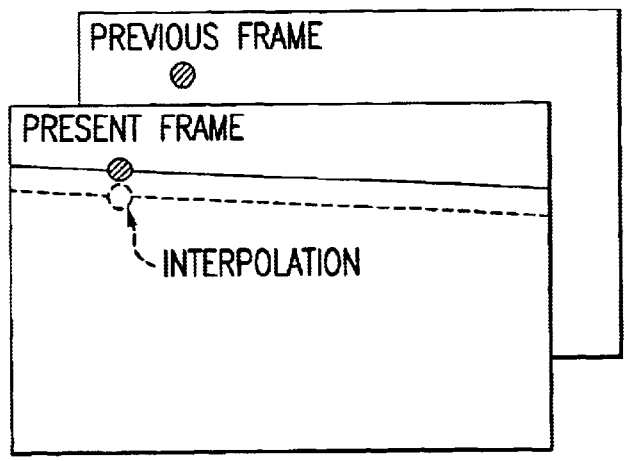

As described in connection with FIGS. 1C, 2A and 2B, however, the synchronous signals contained in the video signal does not coincide with synchronous signals used in a multi-density scan type display device (CRT) in both the geometrical and time bases. It has thus been found that the pointed position, which could be detected in the standard scan type display device, cannot be detected in the multi-density scan type display device.

During the process of overcoming such a problem, the inventor found that a hint relating to the discrimination of the scan mode in the display device existed the light detection signal from the photosensor (or the lighting signal from the display device). More particularly, the fact that many frequency components in the synchronous signals used by the display device were contained in the frequency component of the light detection signal was found.

Thus, this embodiment is designed to discriminate the scan mode in the display device based on the light detection signal from the photosensor included in the gun-type controller.

More particularly, the scan mode of the display device is discriminated by detecting the frequency component (period) of the light detection signal. If the frequency component of the light detection signal contains the horizontal frequency component in the multi-density scan type display device, it is judged that the scan mode in the display device is not standard scan mode, but multi-density scan mode.

Figure 4:
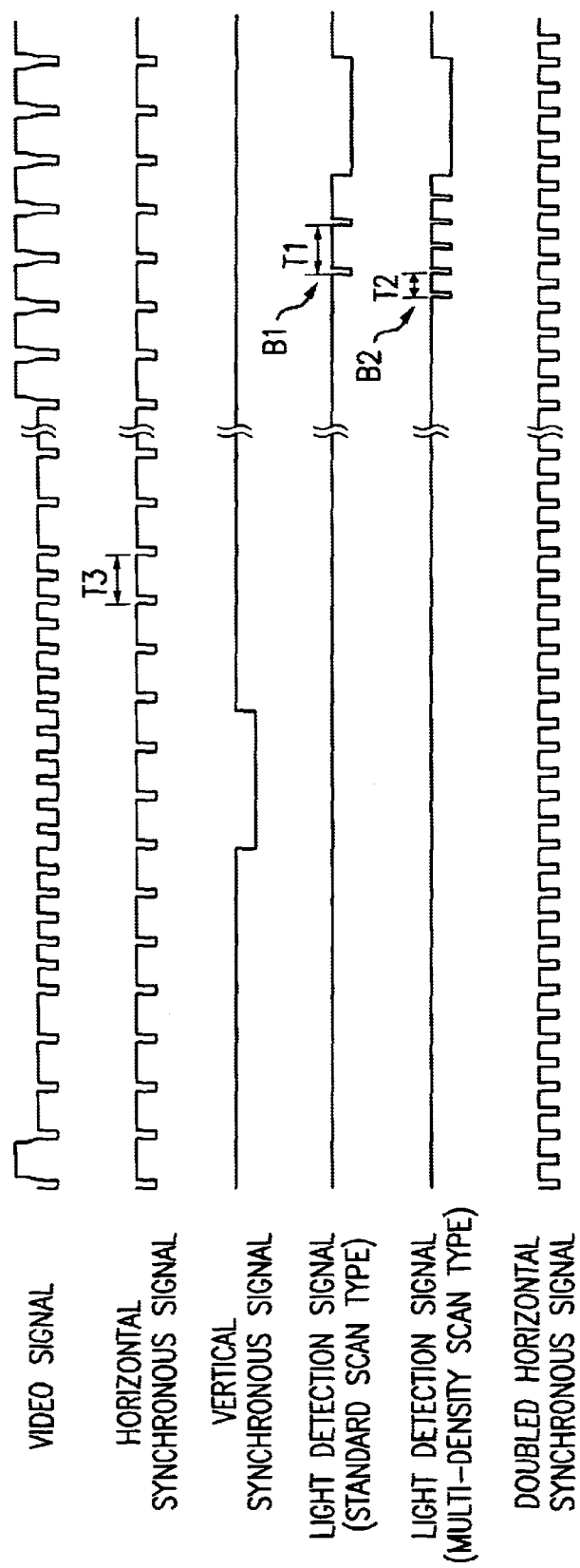
FIG. 4 illustrates a technique of discriminating the scan mode in the display device based on the light detection signal.

A further detail will be described in connection with FIG. 4. If the display device is of standard scan type, a light detection signal outputted from the photosensor is as shown by B1 in FIG. 4. On the other hand, if the display device is of multi-density scan type, the light detection signal is as shown by B2. When pulse repetition times (periods and frequency components) T1 and T2 in the light detection signal are measured, therefore, it can be judged whether the scan mode of the display device is of standard or multi-density scan type.

Figure 5:
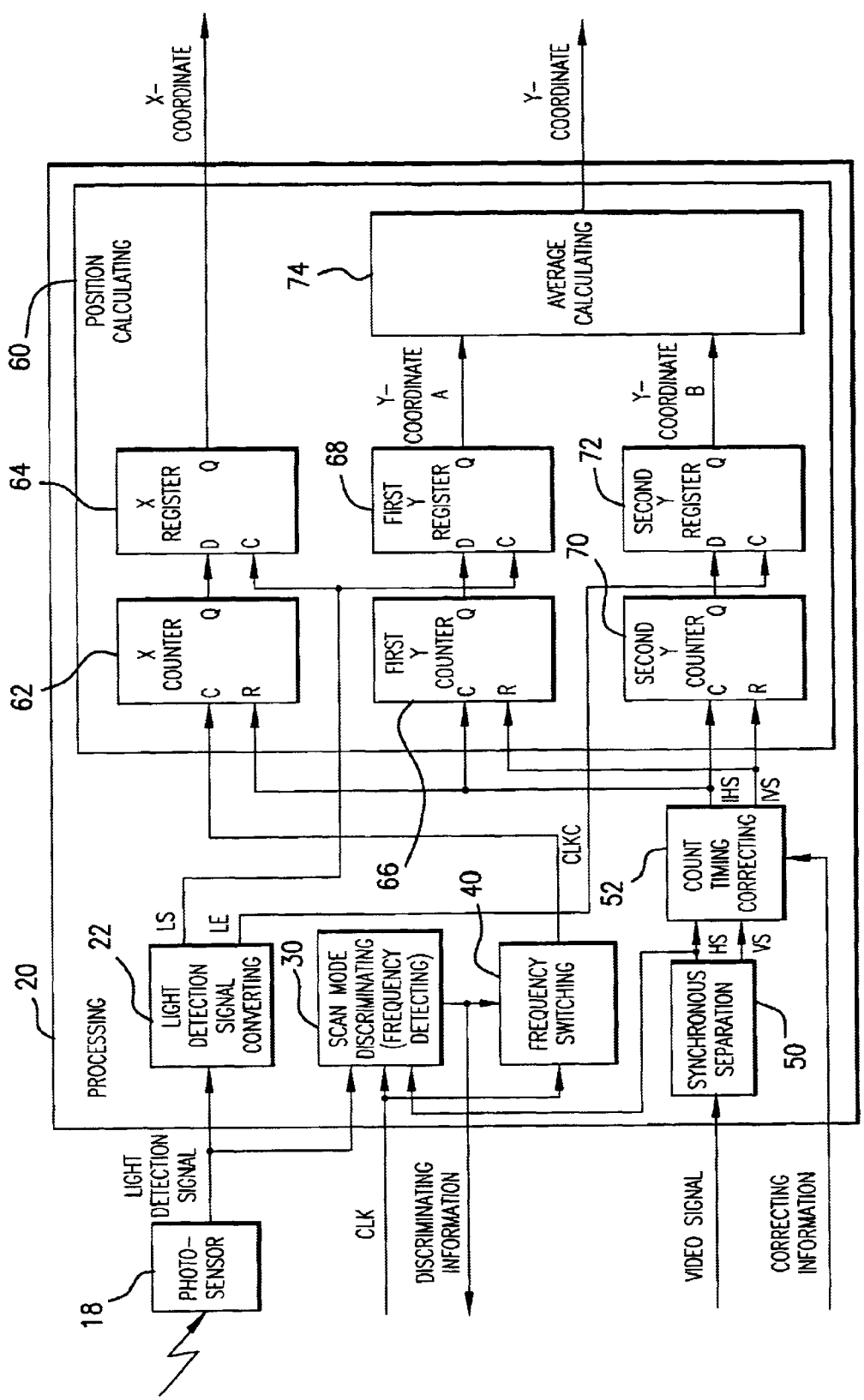
FIG. 5 is a block diagram of a processing section.

To perform a proper measurement of the pulse repetition times in the light detection signal, it is important that the main device 90 of FIG. 3 causes the display device 140 to display a constant and uniform scene (e.g., whole white-colored scene) on measurement FIG. 5 shows a block diagram of the processing section 20.

The processing section 20 comprises a light detection signal converting section 22, a scan mode discriminating section (frequency detecting section) 30, a frequency switching section 40, a synchronous separation section (HV separation and a section) 50, count (measurement) timing correcting section 52 and a position calculating section 60.

The light detection signal converting section 22 samples and converts the light detection signal from the photosensor 18 into signals LS and LE. The signal LS becomes active as the raster scan initially passes through the detection area (142 in FIG. 3) (or at the next raster). The leading edge of the signal LS indicates a point at which the light begins to be received. On the other hand, the signal LE has substantially the same waveform as that of the light detection signal. The last leading edge of the signal LE indicates a point at which the light terminates to be received.

The scan mode discriminating section 30 discriminates the scan mode of the display device based on the light detection signal from the photosensor 18 as described in connection with FIG. 4. The discriminating information of the scan mode (result of discrimination) is then outputted toward the frequency switching section 40 and the main device 90 of FIG. 3.

The frequency switching section 40 switches the frequency of the count clock signal CLKC from one to another, based on the discriminating information from the scan mode discriminating section 30. Even if the scan mode of the display device is variable, thus, the resolution on detection of the pointed position will remain unchanged The synchronous separation section 50 separates horizontal and vertical synchronous signals KS, VS from the composite video image from the main device 90.

The count timing correcting section 52 receives correcting information of pointed position from the main device 90, on which the count timing of the light detection timing in the position calculating section 60 is corrected. More particularly, the timing at which the signal HS and VS become active is shifted based on the correcting information, thereby generating corrected horizontal and vertical synchronous signals IHS, IVS (which are, in a broad sense, count timing setting signals) which are in turn outputted toward the position calculating section 60.

The position calculating section 60 measures the light detection timing based on LS, LE (light detection signals). IHS, IVS (count timing setting signals) and CLKC (count clock signal), thereby calculating the X- and Y-coordinates at the position pointed by the gun-type controller.

The position calculating section 60 comprises an X counter 62, an X register 64, a first Y counter 66, a first Y register 68, a second Y counter 70, a second Y register 72 and an average calculating section 74.

Figure 6:
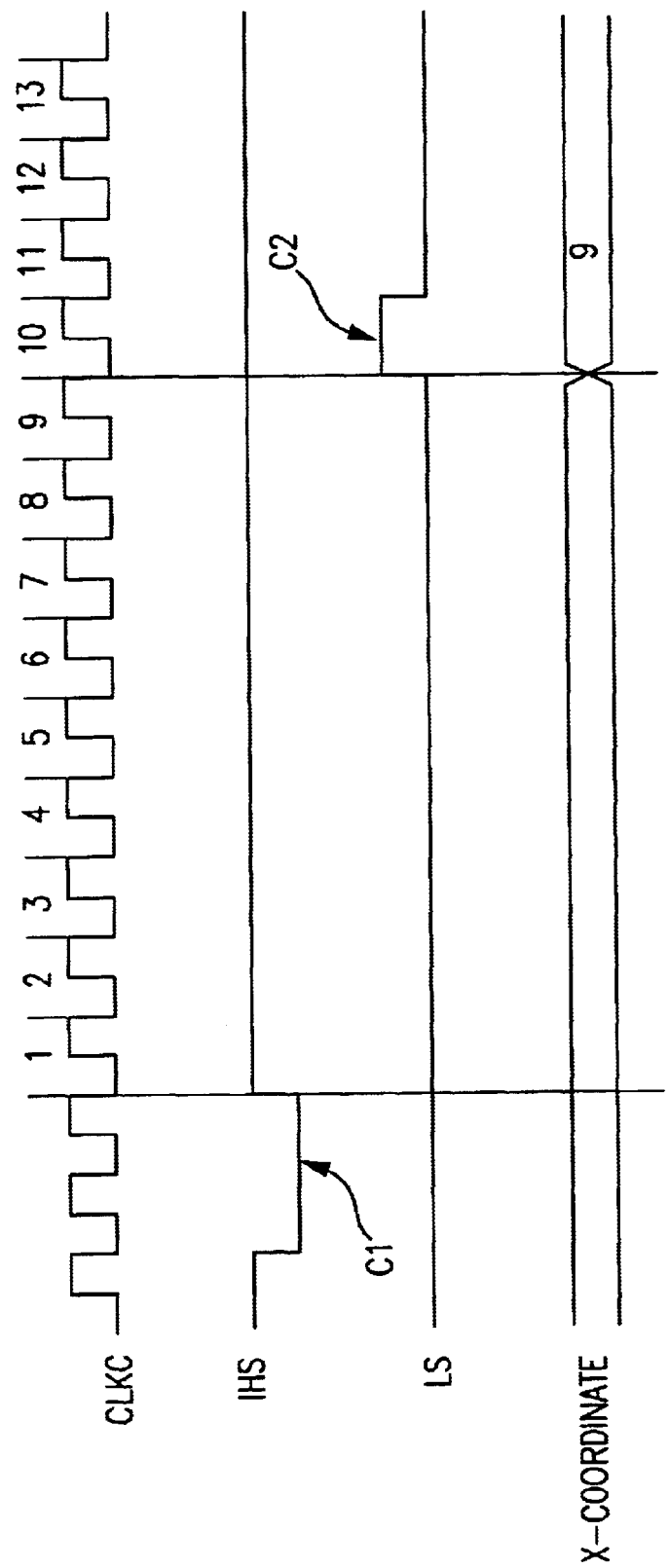
FIG. 6 illustrates a technique of calculating a pointed position.

The X counter 62 is reset as the signal IHS from the count timing correcting section 52 becomes active (L level) as shown by C1 in FIG. 6, and thereafter sequentially increments the count based on the count clock signal CLKC. The X register 64 latches the count in the X counter 62 as the signal LS becomes active (H level) as shown by C2 in FIG. 6. The latched count is outputted toward the main device as X-coordinate at the position pointed by the gun-type controller.

Figure 7:
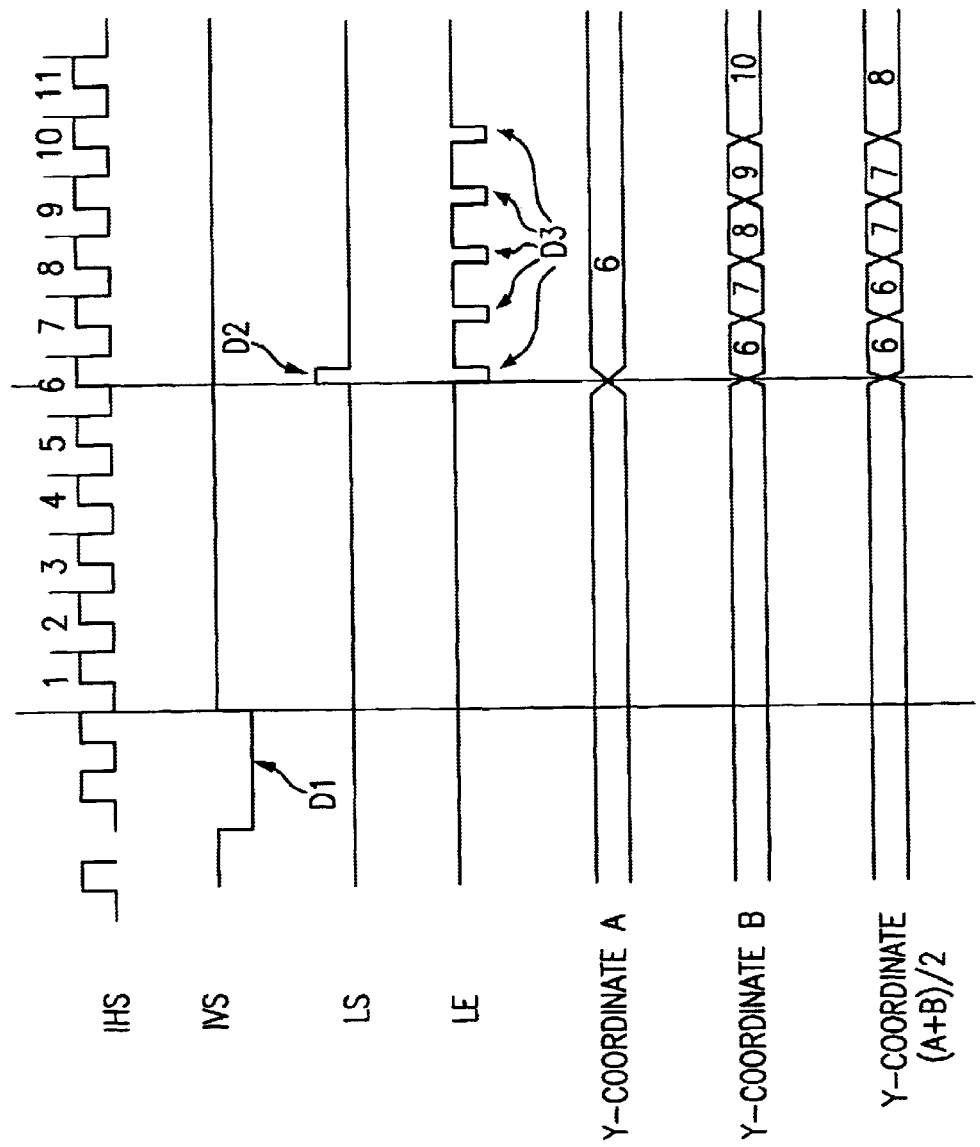
FIG. 7 illustrates another technique of calculating a pointed position.

The first and second Y counters 66, 70 are reset as the signal IVS from the count timing correcting section 52 become active as shown by D1 in FIG. 7, and thereafter sequentially increments the count based on the signal IHS.

The first Y register 68 latches the count in the first Y counter 66 as the signal LS becomes active as shown by D2 in FIG. 7. On the other hand, the second Y register 72 latches the count in the second Y counter 70 as the signal LE becomes active as shown by D3 in FIG. 7. The average calculating section 74 averages the outputs of the first and second Y registers 68, 72. The result is then outputted toward the main device as Y-coordinate at the position pointed by the gun-type controller.

In such a manner, the information of the position pointed by the gun-type controller (X- and Y-coordinates) will be determined.

Figure 8:
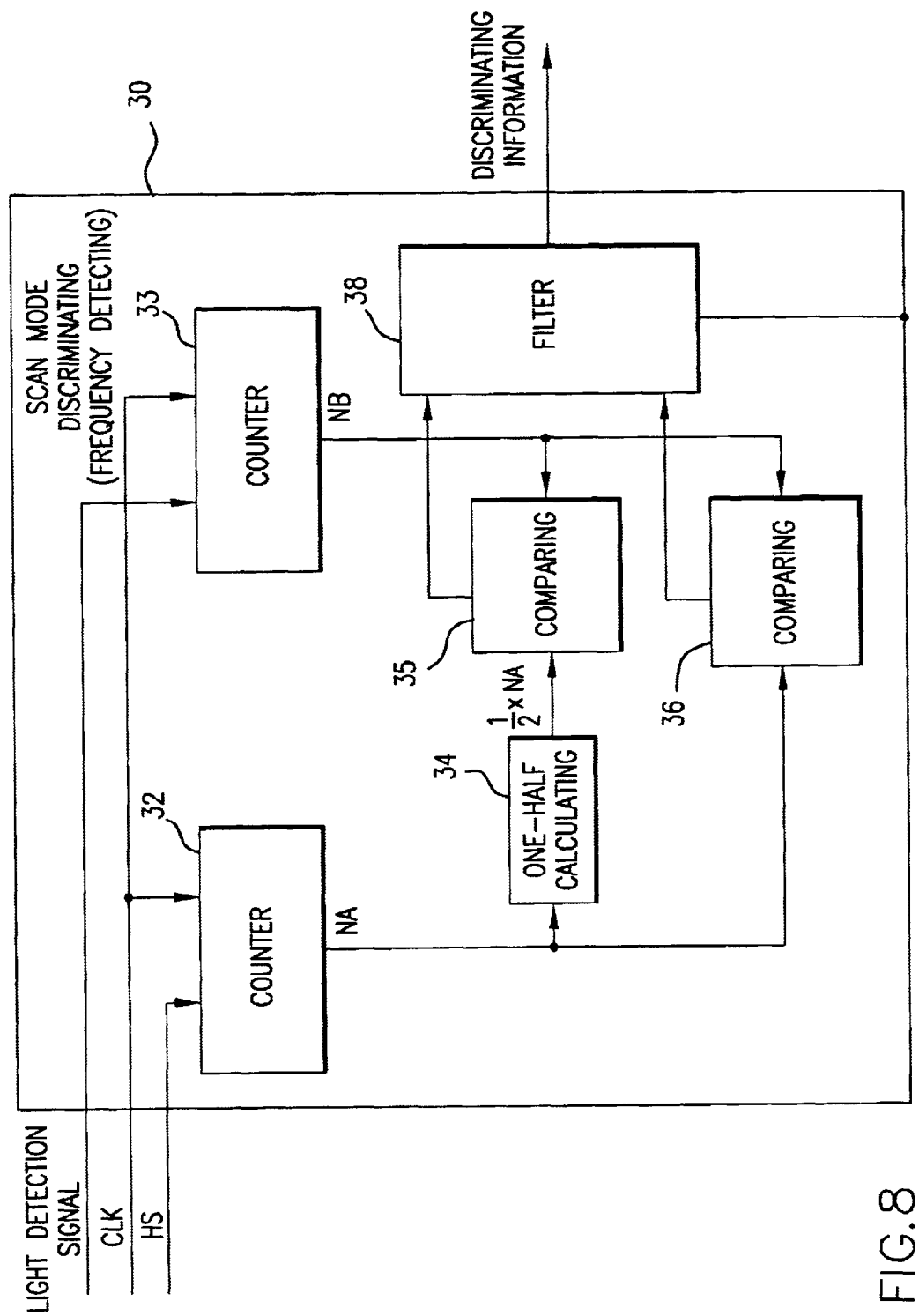
FIG. 8 is a block diagram of a scan mode discriminating section.

FIG. 8 shows a block diagram of the scan mode discriminating section 30.

The scan mode discriminating section 30 comprises counters 32, 33, a one-half calculating section 34, comparing sections 35, 36 and a filter section 38.

The counter 32 receives the horizontal synchronous signal HS separated from the composite video signal from the synchronous separation section 50 and measures the pulse repetition time T3 of the signal HS (see FIG. 4) using a reference clock signal CLK. In other words, the number of clocks NA in the signal CLK counted during the time T3 is determined. The one-half calculating section 34 reduces this number of clocks NA into half.

The counter 33 receives the light detection signal from the photosensor 18 and measures the pulse repetition time T1 or T2 of the light detection signal using the reference clock signal CLK. In other words, the number of clocks NB in the signal CLK counted during the time T1 or T2 is determined.

The comparing section 35 compares the number of clocks NA/2 from the one-half calculating section 34 with the number of clocks ND from the counter 33. If NA/2 is equal or substantially equal to NB, it is judged that the display device is of multi-density scan type. This is because it is considered in FIG. 4 that ½×T3=T2.

On the other hand, the comparing section 36 compares the number of clocks NA from the counter 32 with the number of clocks NB from the counter 33. If NA is equal or substantially equal to NB, it is judged that the display device is of standard scan type. This is because it is considered in FIG. 4 that T3=T1.

After any noise in the outputs of the comparing sections 35 and 36 has been removed by the filter section 38, these outputs are outputted toward the main device 90 and frequency switching section 40 as discriminating information (information of frequency detection).

In such a manner, this embodiment can successfully discriminate whether the scan mode of the display device is of standard or multi-density scan type.

3. Correction of Count Timing

Figure 9A:
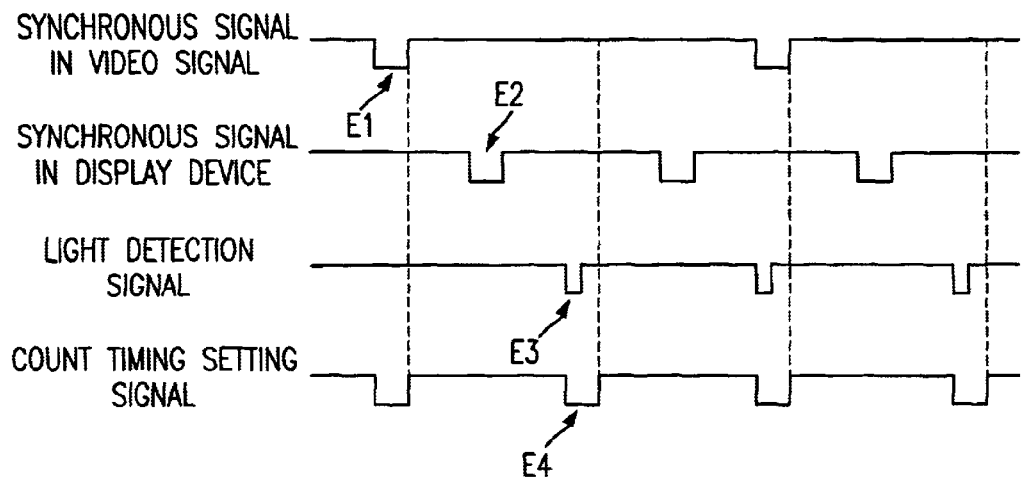
FIGS. 9A and 9B illustrate a technique of correcting the count timing of the light detection signal.

In the multi-density scan type display device, the synchronous signals used in the display device lags from the synchronous signals contained in the video signal, as shown by E1 and E2 in FIG. 9A. This is because the multi-density scan type display device performs various digital computations for interpolating the scan line signals. The amount of lag depends on the type of the multi-density scan mode. The lag is classified into three, that is, horizontal lag, vertical lag and frame lag.

If the synchronous signals used in the display device have the lag, the light detection signal from the photosensor also has a lag. At this time, if the frequency in the synchronous signals of the video signal is simply doubled to generate the count timing setting signal, the measurement of the light detection signal, for example, at such a position as shown by E4 becomes impossible. In other words, the count timing setting signal will be active to reset the first and second Y counters 66, 70 of FIG. 5 at such a timing as shown by E4 in FIG. 9A. Therefore, the timing at which the light detection signal becomes active cannot be measured.

In addition to the doubling of the frequency in the synchronous signals of the video signal, this embodiment shifts and corrects the timing at which the synchronous signals of the video signal become active and then generates the count timing setting signals (IHS and IVS in FIG. 5). Thus, the timing at which the light detection signal becomes active can properly be measured without occurrence of such a situation as shown by E4 in FIG. 9A.

The amount of shift in the count timing setting signals is determined by the correcting information delivered from the main device.

Figure 9B:
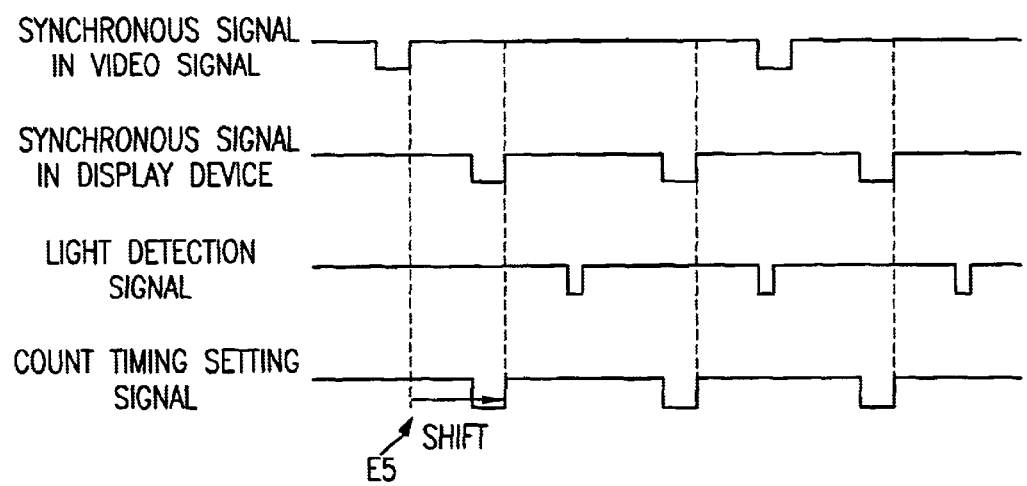

In other words, the player is first indicated to point a reference position on the screen (e.g., the center of the screen). The main device determines the deviation between the pointed position obtained at that time and a reference position. This deviation is then used to determine the correcting information which is in turn transmitted from the main device to the gun-type controller. The gun-type controller then determines the amount of shift shown by E5 in FIG. 9B, based on this correcting information.

In such a manner, the accuracy of detection relating to the pointed position can be maintained at its increased level without dependence on the type of the display device (TV receiver).

4. Switching of the Frequency in the Count Clock Signal

In this embodiment, the frequency in the count clock signal is switched from one to another based on the result of discrimination relating the scan mode of the display device.

Figure 10A:
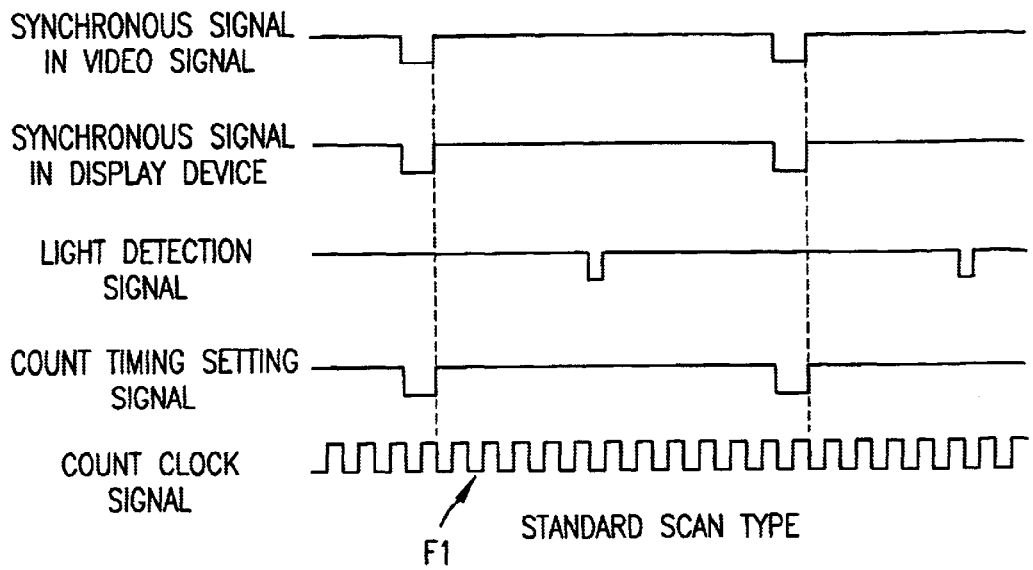
FIGS. 10A and 10B illustrate a technique of switching the frequency of the count clock signal CLKC from one to another such that the resolution in detection of the pointed position will not be changed depending on the scan mode.
Figure 10B:
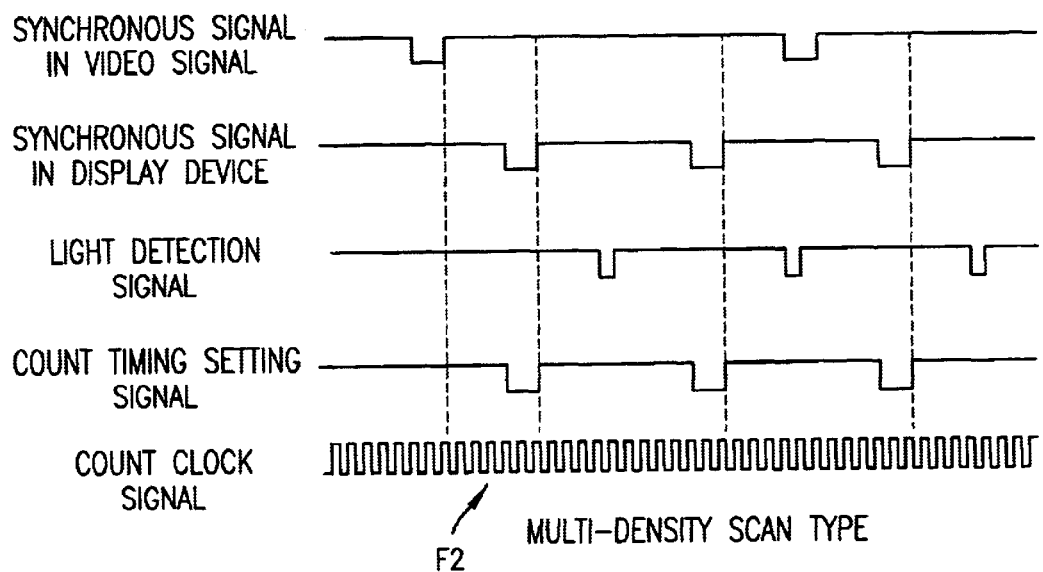

If the frequency of the count clock signal in the standard scan type display device is one (1) as shown by F1 in FIG. 10A and by F2 in FIG. 10B, the frequency of the count clock signal in the multi-density scan type display device is set two (2).

Thus, the number of clocks between the count start timing and light detection timing is invariable without dependence on the type of the display device. Therefore, the resolution on detection of the pointed position remains unchanged without dependence on the type of the display device. As a result, the accuracy of detection relating to the pointed position can be maintained constant.

Figure 11:
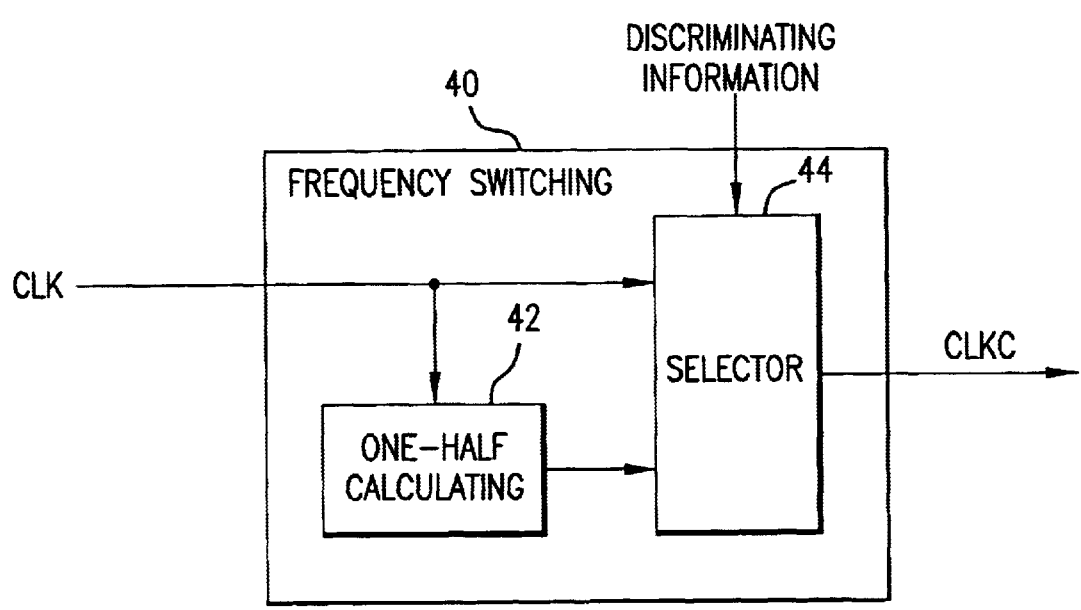
FIG. 11 is a block diagram of a frequency switching section.

FIG. 11 shows a block diagram of the frequency switching section 40.

The frequency switching section 40 comprises a one-half calculating section 42 and a selector 44.

The one-half calculating section 42 reduces the frequency of the reference clock signal CLK into half.

When it is judged based on the discriminating information that the display device is of multi-density scan type, the selector 44 selects the reference clock signal CLK which is in turn outputted therefrom as the count clock signal CLKC.

On the other hand, if it is judged from the discriminating information that the display device is of standard scan type, the selector 44 selects the output of the one-half calculating section 42 which is in turn outputted therefrom as the count clock signal CLKC.

Thus, the frequency of the count clock signal in the multi-density scan type display device is two times larger than that of the standard scan type display device. Consequently, the resolution on detection of the pointed position can be invariable.

5. Regulation of the Position Pointed by the Gun-type Controller

Figure 12:
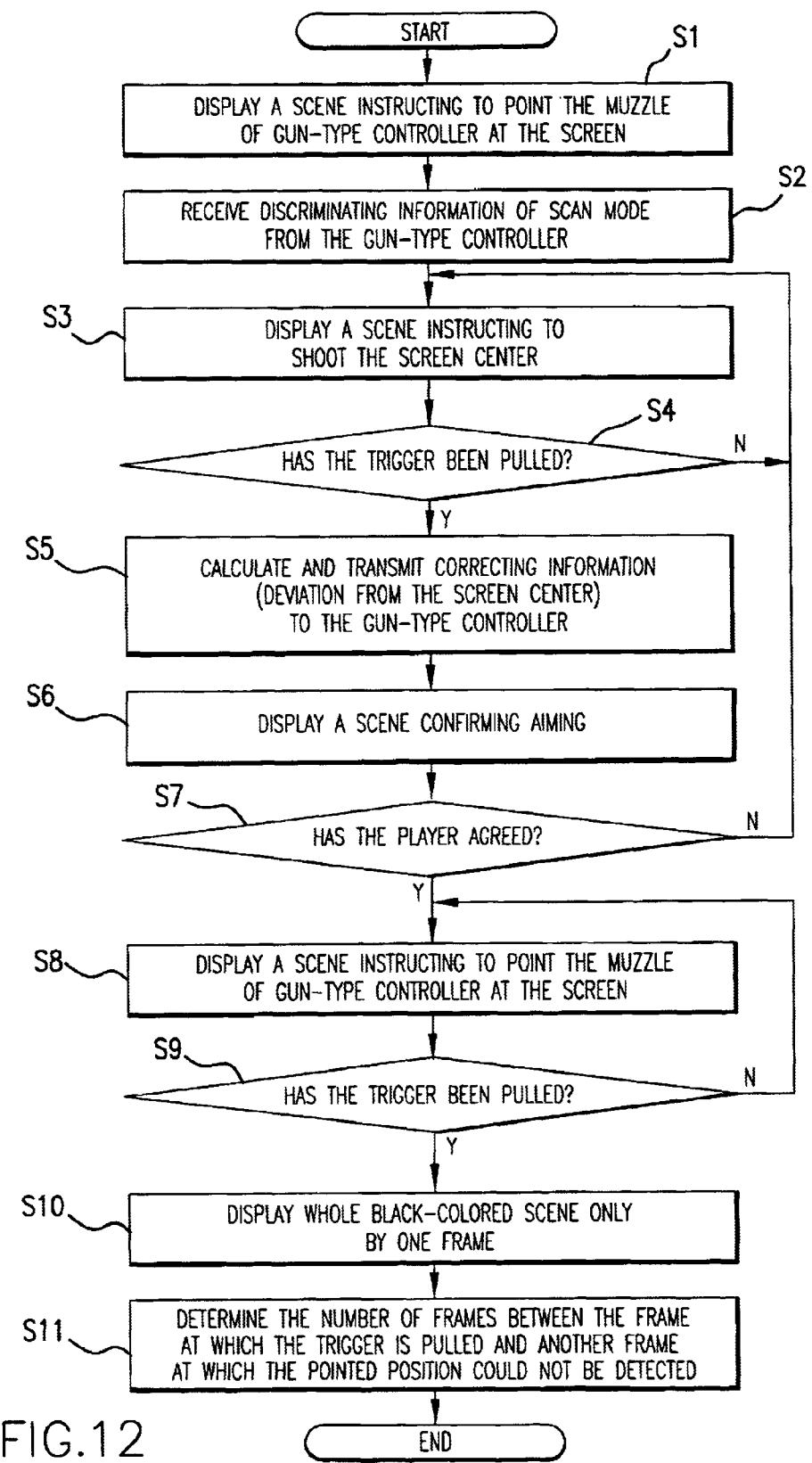
FIG. 12 is a flowchart illustrating a regulation relating to the position pointed by the gun-type controller.

In this embodiment, the player regulates the position pointed by the gun-type controller prior to the start of game while viewing a series of pointed position regulating scenes. FIG. 12 shows a flowchart illustrating a process of performing such a regulation on the side of the main device (software) while FIGS. 13A–D exemplifies several pointed position regulating scenes.

Figure 13A:
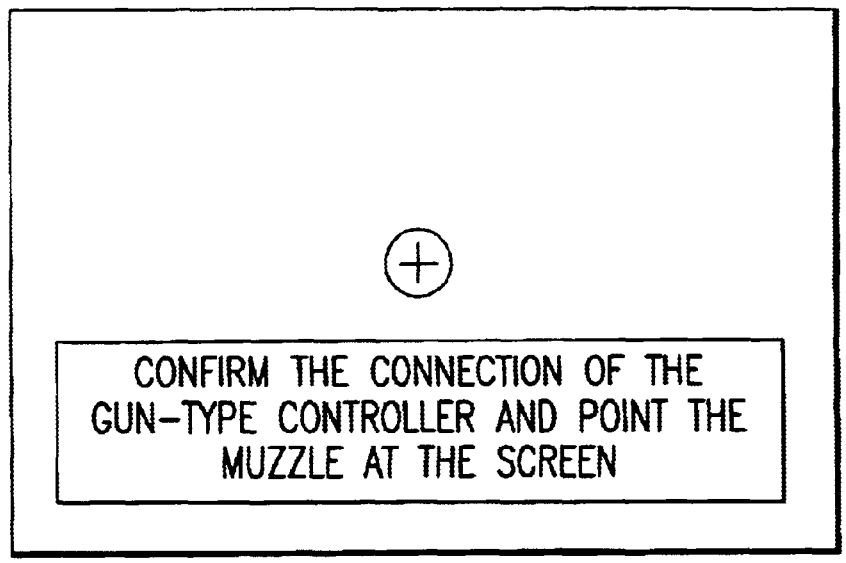
FIGS. 13A. 13B, 13C and 13D show various scene for regulating the pointed position.

First of all, as shown in FIG. 13A, a scene instructing the player to point the muzzle of the gun-type controller at the screen is displayed (step S1). Thus, the gun-type controller discriminates the scan mode of the display device as described in connection with FIGS. 4 and 8. The main device receives the discriminating information from the gun-type controller (step S2).

Figure 13B:
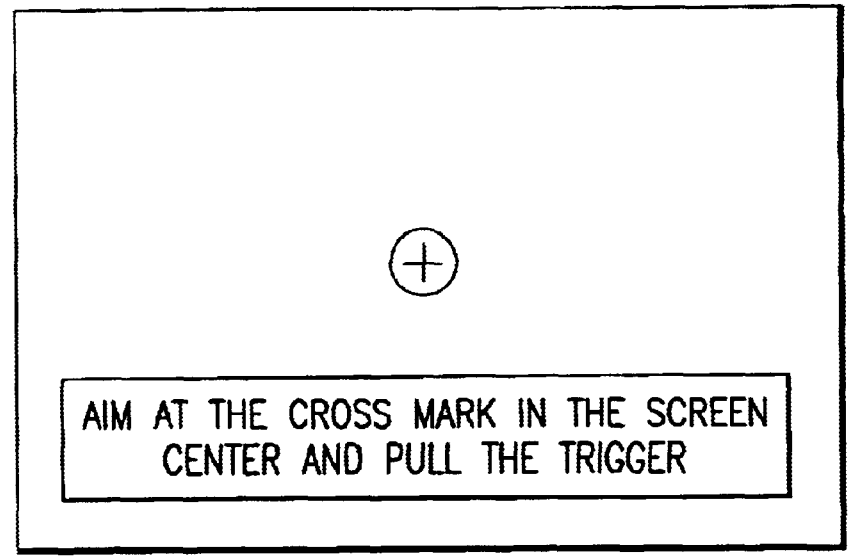

Next, as shown in FIG. 13B, another scene instructing the player to aim and shoot a cross mark on the center of the screen is displayed (step S3). It is then judged whether or not the player has pulled the trigger of the gun-type controller (step S4). If the trigger has been pulled, the correcting information (or deviation from the screen center) is calculated and then transmitted to the gun-type controller (step S5).

More particularly, when the player pulls the trigger, the screen is flashed or wholly white-colored. As the processing section in the gun-type controller calculates the position pointed by the gun-type controller (X- and Y-coordinates) through such a technique as described in connection with FIGS. 6 and 7, this information of pointed position is transmitted from the gun-type controller to the main device. The main device uses the information of pointed position to calculate the correcting information (or deviation from the screen center) which is in turn transmitted to the gun-type controller. The gun-type controller then uses this correcting information to correct the count timing of the light detection signal through such a technique as described in connection with FIG. 9B. In other words, the count timing setting signals (IRS, IVS) are shifted by a value corresponding to the correcting information. Thus, the subsequent detection of the pointed position can properly be carried out.

Figure 13C:
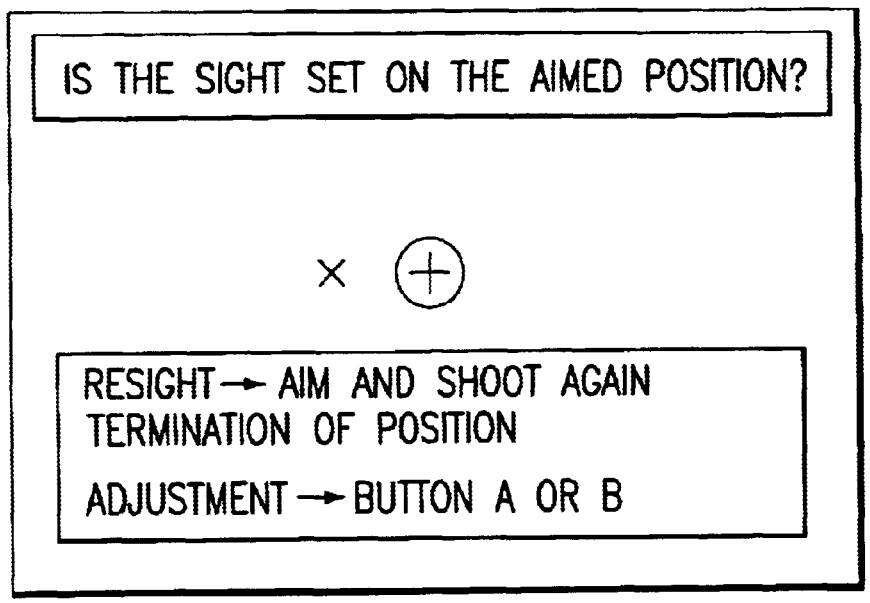

Next, as shown in FIG. 13C, still another scene confirming the aiming is displayed (step S6). It is then judged whether or not the player has agreed (step S7). If the player has agreed (or if the player wants to resight), the procedure returns to the step S3.

Figure 13D:
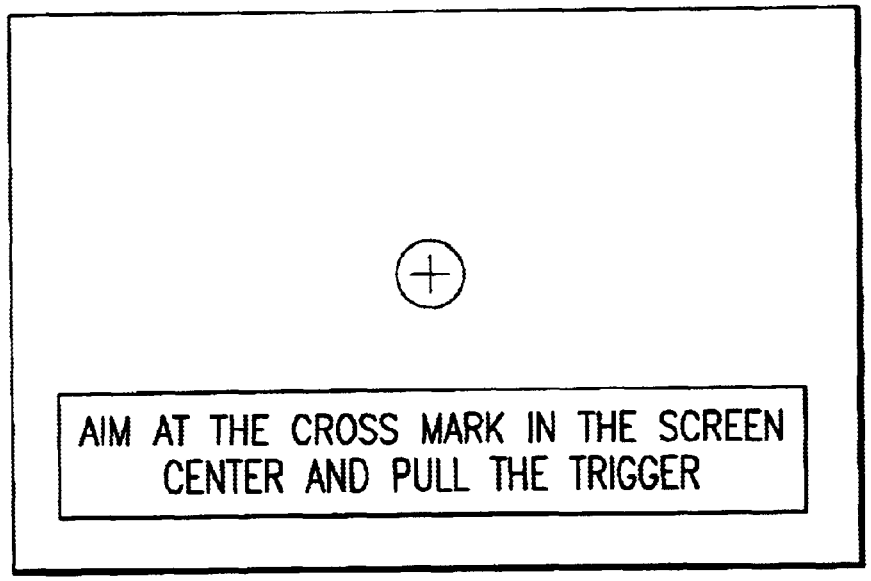

If the player has agreed, a further scene instructing the player to point the muzzle of the gun-type controller and to pull the trigger is displayed as shown in FIG. 13D (step S8). It is then judged whether or not the player has pulled the trigger of the gun-type controller (step S9). If the trigger has been pulled, the whole black-colored scene is displayed only by one frame (step S10) There is then determined the number of frames between the frame at which the player pulls the trigger and another frame at which the pointed position could not be detected (step S11). Thus, the number of lag frames relating to the light detection signal is detected.

Figure 14:
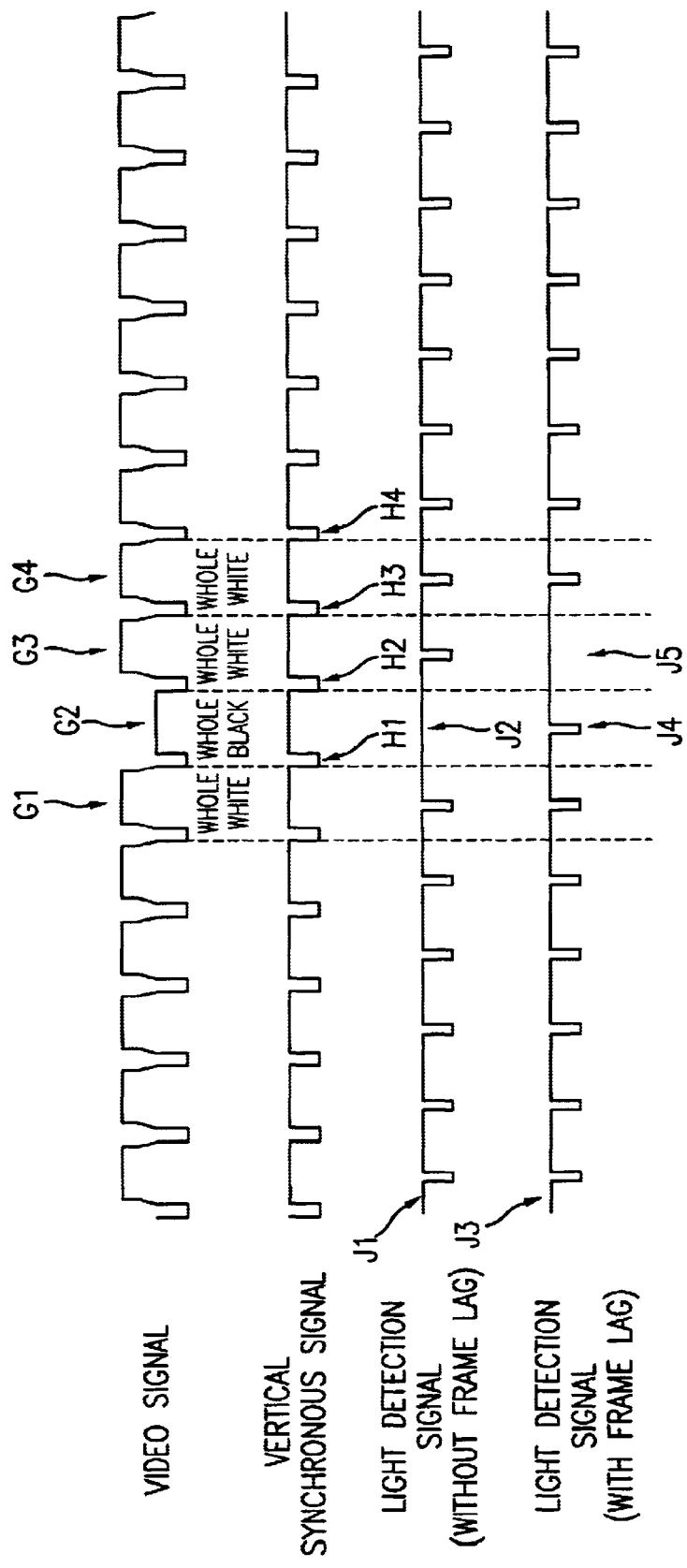
FIG. 14 illustrates a technique of detecting the frame

More particularly, the whole black-colored scene (which is, in a broad sense, a distinctive frame scene used to detect the frame lag in the light detection signal) is displayed only by one frame as shown by G2 in FIG. 14 when a series of whole white-colored scenes are being displayed as shown by G1, G3 and G4 in FIG. 14. In other words, the whole black-colored scene is displayed in the next frame when the player pulls the trigger.

The information of pointed position corresponding to the frame scenes shown by G1, G2, G3 and G4 in FIG. 14 are assumed to be taken in the main device at the respective timings H1, H2, H3 and H4.

In the standard scan type display device in which the lag itself does not substantially occur or in the multi-density scan type display device in which the lags occur in the horizontal and vertical directions, but the frame lag does not occur, the waveform of the light detection signal from the photosensor is as shown by J1 in FIG. 14.

In other words, the photosensor will not detect the scanning beam in the display device on the frame of G2. Thus, the light detection signal will not be active as shown by J2. Therefore, the main device can take in the information of pointed position relating to the gun-type controller at the timings shown by H1, H3 and H4, but can not take in the information of pointed position at the timing shown by H2. Therefore, the main device can recognize that the screen of the display device did not light at the frame of G2. This means that the output timing (G2) of the video signal for the whole black-colored scene coincides with the other timing (H2) at which the pointed position was not taken in the main device. As a result, the main device can discriminate that the frame lag did not occur.

On the other hand, in the multi-density scan type display device in which the frame lag occurs, the waveform of the light detection signal from the photosensor is as shown by J3 in FIG. 14

In other words, the photosensor detects the scanning beam at the frame of G2. Thus, the light detection signal becomes active as shown by J4. At the frame of G3, however, the photosensor does not detect the scanning beam and the light detection signal is not active as shown by J5. Therefore, the main device can take in the information of pointed position from the gun-type controller at the timings H1, H2 and H4, but can not take in the information of pointed position at the timing H3. Thus, the main device can recognize that the screen of the display device did not light at the frame of G3. This means that the output timing (G2) of the video signal for the whole black-colored scene does not coincide with the other timing (H3) at which the pointed position cannot be taken in the main device. As a result, the main device can discriminate that the frame lag occurred. Since it is also judged that the whole black colored scene to be displayed at the frame of G2 was displayed at the frame of G3, the main device can judge that the number of lag frames is one (1).

In such a manner, the frame lag relating to two or more frames can similarly be detected by comparing the output timing of the video signal for the whole black-colored scene with the timing at which the pointed position could not be taken in.

The present invention is not limited to the aforementioned embodiments, but may be carried out in any of various other forms.

For example, the invention relating to one of the dependent claims may not contain part of the structural requirements in any claim to which the one dependent claim belongs. The primary part of the invention defined by one of the independent claim may be belonged to any other independent claim.

Although the embodiments have been described as to discrimination of the scan mode in the display device by detecting the frequency components in the light detection signal, the present invention is not limited to such discrimination, but may be carried out to discriminate the scan mode by detecting any other element in the light detection signal.

Although the embodiments have been described as to discrimination between the standard scan type and multi-density scan type display devices, the present invention is not limited to such discrimination. For example, the principle of the present invention may be applied to discrimination between the standard scan type and high-vision type display devices. The standard scan type may be considered to be PAL other than NTSC.

The configuration of the position pointing device is not limited to those described in connection with FIGS. 5, 8 and 11.

It is particularly desirable that the present invention is applied to the gun-type controller. However, the present invention may similarly be applied to any of various other position pointing devices such as game controllers and the like.

In addition to home game systems, the present invention may be applied to arcade game systems, large-scale attractions in which a number of player enter a game and various image systems such as simulators, multi-media terminals and so on.

What is claimed is:

1. A position pointing device for pointing a position on a screen of a display device, comprising:
   a pointer which is used to point a position on a screen of a display device;
   a photosensor provided in the pointer which senses a light from a position pointed by the pointer; and
   discriminating means which discriminates a scan made of a display device based on the light detection signal from the photosensor.

2. The position pointing device as defined in claim 1, wherein the discriminating means discriminates a scan mode of a display device by detecting a frequency component of the light detection signal.

3. The position pointing device as defined in claim 2, wherein the discriminating means judges that a scan mode of a display device is not a standard scan type, but a multi-density scan type when a frequency component of the light detection signal includes a frequency component of a synchronous signal of a multi-density scan type display device.

4. The position pointing device as defined in claim 1, further comprising:
   position calculating means which measures a light detection timing based on the light detection signal, a count timing setting signal and a count clock signal, and calculates a position pointed by the pointer; and correcting means which corrects a count timing of a light detection timing in the position calculating means based on correcting information of the pointed position.

5. The position pointing device as defined in claim 4, wherein the correcting means generates the count timing setting signal by shifting a timing at which a synchronous signal included in a video signal becomes active based on the correcting information, and corrects a count timing of a light detection timing in the position calculating means.

6. The position pointing device as defined in claim 1, further comprising:

position calculating means which measures a light detection timing based on the light detection signal, a count timing setting signal and a count clock signal, and calculates a position pointed by the pointer; and frequency switching means which switches a frequency of the count clock signal based on discriminating information of a scan mode obtained by the discriminating means so that a resolution in detecting a pointed position remains unchanged when a scan mode of a display device is changed.

7. A computer-usable program comprising a processing routine for causing a computer to realize:

means which performs a process of causing a display device to display a scene for regulating a position pointed by a position pointing device; and means which receives discriminating information of a scan mode of a display device and calculated information of a pointed position from the position pointing device which discriminates a scan mode of a display device based on a light detection signal from a photosensor, then calculates correcting information of the pointed position and transmits the calculated correcting information to the position pointing device.

8. A computer-usable program comprising a processing routine for causing a computer to realize:

means which performs a process of causing a display device to display a distinctive frame scene for detecting a frame lag of a light detection signal in a position pointing device; and detecting means which detects a frame lag of a light detection signal due to a scan mode of a display device, based on an output timing of a video signal of the distinctive frame scene and an output timing of pointed position information which output from the position pointing device corresponding to the distinctive frame scene.

9. The computer-usable program as defined in claim 8, wherein the distinctive frame scene is a whole black-colored scene, and wherein the detecting means detects a frame lag of a light detection signal based on an output timing of a video signal of the whole black-colored scene and an output timing of pointed position information representing that no light from a display device is detected.

10. A method of detecting a position pointed by a position pointing device, comprising:

performing a process of causing a display device to display a scene for regulating a position pointed by the position pointing device:

receiving discriminating information of a scan mode of a display device and calculated information of a pointed position from the position pointing device which discriminates a scan mode of a display device based on a light detection signal from a photosensor;

calculating correcting information of the pointed position and transmitting the calculated correcting information to the position pointing device;

correcting a count timing of a light detection timing based on the transmitted correcting information; and calculating a position pointed by the position pointing device based on the corrected count timing.

11. The method as defined in claim 10, wherein a scan mode of a display device is discriminated by detecting a frequency component of the light detection signal.

12. The method as defined in claim 11, wherein it is judged that a scan mode of a display device is not a standard scan type, but a multi-density scan type when a frequency component of the light detection signal includes a frequency component of a synchronous signal of a multi-density scan type display device.

13. A method of detecting a position pointed by a position pointing device, comprising:

performing a process of causing a display device to display a distinctive frame scene for detecting a frame lag of a light detection signal in a position pointing device;

detecting a frame lag of a light detection signal due to a scan mode of a display device, based on an output timing of a video signal of the distinctive frame scene and an output timing of pointed position information which is output from the position pointing device corresponding to the distinctive frame scene; and calculating a position pointed by the position pointing device based on the detected frame lag.

14. The method as defined in claim 13, wherein the distinctive frame scene is a whole black-colored scene, and wherein a frame lag of a light detection signal is detected based on an output timing of a video signal of the whole black-colored scene and an output timing of pointed position information representing that no light from a display device is detected.

15. The method as defined in claim 13, wherein a scan mode of a display device is discriminated by detecting a frequency component of the light detection signal.

16. The method as defined in claim 15, wherein it is judged that a scan mode of a display device is not a standard scan type, but a multi-density scan type when a frequency component of the light detection signal includes a frequency component of a synchronous signal of a multi-density scan type display device.

* * * * *